US012172898B2

(12) United States Patent
Chen et al.

(10) Patent No.: US 12,172,898 B2
(45) Date of Patent: Dec. 24, 2024

(54) METHOD FOR PREPARING HARD CARBON ANODE OF LITHIUM/SODIUM ION BATTERY BY BIOCHAR

(71) Applicant: HAINAN UNIVERSITY, Hainan (CN)

(72) Inventors: Yong Chen, Hainan (CN); Heng Zheng, Hainan (CN); Yan Mo, Hainan (CN); Bokai Cao, Hainan (CN)

(73) Assignee: Hainan University, Hainan (CN)

( * ) Notice: Subject to any disclaimer, the term of this patent is extended or adjusted under 35 U.S.C. 154(b) by 0 days.

(21) Appl. No.: 17/595,274

(22) PCT Filed: Oct. 12, 2021

(86) PCT No.: PCT/CN2021/123168
§ 371 (c)(1),
(2) Date: Nov. 12, 2021

(87) PCT Pub. No.: WO2023/050466
PCT Pub. Date: Apr. 6, 2023

(65) Prior Publication Data
US 2024/0043276 A1 Feb. 8, 2024

(30) Foreign Application Priority Data
Sep. 29, 2021 (CN) .......................... 202111155761.0

(51) Int. Cl.
C01B 32/05 (2017.01)
H01M 4/587 (2010.01)
(Continued)

(52) U.S. Cl.
CPC ............. C01B 32/05 (2017.08); H01M 4/587 (2013.01); C01P 2002/72 (2013.01);
(Continued)

(58) Field of Classification Search
CPC ... C01B 32/05; H01M 4/587; H01M 10/0525; H01M 10/36; H01M 4/0471;
(Continued)

(56) References Cited

FOREIGN PATENT DOCUMENTS

CN 109921018 * 6/2019 ............ H01M 4/583

OTHER PUBLICATIONS

Del Mar Saavedra Rios, et al., Biochars from various biomass types as precursors for hard carbon anodes in sodium-ion batteries, Biomass and Bioenergy 2018; 117: 32-37 (Year: 2018).*

(Continued)

Primary Examiner — Daniel C. McCracken
(74) Attorney, Agent, or Firm — WELSH FLAXMAN & GITLER LLC

(57) ABSTRACT

Provided is a method for preparing a hard carbon anode of a lithium/sodium ion battery by biochar, which includes the following steps: S1 biochar pretreatment, S2, preparing a precursor material and S3 pyrolysis carbonization, by a modification of the biochar, setting carbonization temperature and carbonization time, and controlling a cooling rate, so that the obtained biochar generates amorphous carbon after carbonization with low graphitization degree, few surface defects, larger charge-discharge specific capacity, and stable performance in the cycle charging and discharging process; at the same time, the process of the application is relatively simple, and a special complex process is reduced; the present method is suitable for a large-scale industrial production without special adjustment or control of a morphology; and the product performance is relatively good and thus has certain competitive advantages.

9 Claims, 2 Drawing Sheets

(51) Int. Cl.
*H01M 10/0525* (2010.01)
*H01M 10/36* (2010.01)

(52) U.S. Cl.
CPC ...... *C01P 2002/82* (2013.01); *C01P 2006/40* (2013.01); *H01M 10/0525* (2013.01); *H01M 10/36* (2013.01)

(58) Field of Classification Search
CPC . H01M 4/133; C01P 2002/72; C01P 2002/82; C01P 2006/40; Y02E 60/10
See application file for complete search history.

(56) References Cited

OTHER PUBLICATIONS

English Translation of Written Opinion of the International Searching Authority in PCT/CN2021/123168 dated May 31, 2022 (Year: 2022).*
Machine Translation of CN 109921018 to Ningbo Shanshan New Materila Technology Co Ltd. (H01M 4/583; Jun. 21, 2019) (Year: 2019).*

* cited by examiner

METHOD FOR PREPARING HARD CARBON ANODE OF LITHIUM/SODIUM ION BATTERY BY BIOCHAR

FIELD OF THE INVENTION

The present application relates to the field of biomaterials, in particular to a method for preparing a hard carbon anode of a lithium/sodium ion battery with biochar.

BACKGROUND OF THE INVENTION

In recent years, with a development of portable electronic products such as mobile phones, tablet computers and notebook computers, and a continuous popularization of new energy electric vehicles, the demand for energy storage systems is increasing. Graphite is widely used as an anode material for lithium ion batteries due to its good stability and long cycle life; however, a theoretical specific capacity of graphite is only 372 mAh/g, which prevents the graphite anode materials from meeting an increasing demand for high energy density and power density; moreover, long cycle stability of coated graphite anode materials obtained by a coating and other processes is not ideal; biochar is formed by pyrolysis of various natural raw materials, and its microstructure is formed by stacking graphite sheets in disorder, so it is a good raw material for preparing the anode materials; however, the carbon anode material prepared by the current method has an irregular morphology, many surface defects, a limited capacitance, a poor performance in the long-cycle charging and discharging process, and disadvantages of long preparation time and tedious steps, which lead to a high cost.

BRIEF SUMMARY OF THE INVENTION

In view of this, provided is the method for preparing the hard carbon anode of the lithium/sodium ion battery by biochar to solve the above problems.

A technical solution of the present invention is realized as follows: the method for preparing the hard carbon anode of the lithium/sodium ion battery by biochar comprises:

S1, biochar pretreatment: adding a hydrochloric acid to modified biochar for a pickling for 3 to 12 hours, and then rinsing with a deionized water to neutrality; removing residual biomass and impurities existing in the biochar by pickling; the biomass after the pickling being left with the hydrochloric acid, which needs to be rinsed with a large amount of deionized water to achieve purposes of pH adjustment and impurity removal;

S2, preparing a precursor material: pouring the rinsed biochar into a ball mill jar, adding an absolute ethanol for a milling and crushing; filtering and drying after a ball milling is completed to obtain the precursor material, wherein the biomass materials need to be milled in a stainless steel ball mill jar, and the ball milling can be divided into a wet ball milling and a dry ball milling; and S3, pyrolysis carbonization: placing the precursor material obtained above in a tubular furnace, carbonizing in an argon atmosphere with a carbonization temperature of 1200 to 1300° C., a carbonization time of 0.5 to 3 hours, and an aeration rate of 10 to 30 mL/min, performing a heat preservation for 1 to 3 hours after the carbonization is finished, cooling to 800 to 1100° C., and inletting the argon for a natural cooling to 25 to 30° C. to obtain a hard carbon anode material, wherein the heat preservation time should not be too long in case of a decline in product performance, or too short in case of a performance decline due to an incomplete carbonization.

Further, the modified biochar is prepared by impregnating the biochar in a modified liquid at 20 to 40° C. for 0.2 to 2.5 hours, and then drying at 150 to 200° C.; the biochar is impregnated in the modified liquid to make a cellulose swell and form fine pores; in this process, the biochar is cross-linked within the molecules, and the internal molecules undergo an aromatization reaction to continuously form new carbon molecules; at the same time, the modified liquid has a certain dehydration effect, which makes the hydrogen and oxygen elements in the biochar easy to be removed in the form of water under a high temperature drying, and therefore activates the biochar.

Further, the modified liquid is N-N dimethylformamide and m-aminophenylurea hydrochloride solution in a volume ratio of 1 to 5:3.

Further, a concentration of the hydrochloric acid in Si is 0.5 to 1.5 M.

Further, a mass-volume ratio of the biochar to the hydrochloric acid in Si is 1:0.077 to 0.13 g/mL.

Further, a mass-volume ratio of the biochar to the absolute ethanol in S2 is 0.6 to 1.3:3 to 5 g/mL.

Further, a revolving speed of the ball mill jar in S2 is 200 to 500 rpm, and a ball milling time is 3 to 12 hours.

Further, a temperature elevation program of the tubular furnace in S3 is 30° C. to 1000° C.: a temperature elevation rate is 4 to 6° C./min, and 1000 to 1300° C.: the temperature elevation rate is 3 to 5° C./min, and the temperature elevation rate should not be too high, otherwise an internal structure is easily damaged.

Further, a cooling rate of the tubular furnace in S3 is 3 to 5° C./min, as to maintain a temperature of the product to drop slowly, otherwise, cracks will appear in the product, and the performance will be declined.

Compared with the prior art, the present invention has the beneficial effects that:

Using the method for preparing the hard carbon anode of the lithium/sodium ion battery by biochar to optimizing a process treatment by modifying the biochar, pyrolyzing and carbonizing the biochar after activation, adding the argon for treatment, setting the carbonization temperature and the carbonization time, and controlling a cooling rate, so that the obtained biochar generates an amorphous carbon after carbonization, with a low graphitization degree, few surface defects, a larger charge-discharge specific capacity and stable performance in the cycle charging and discharging process; at the same time, the process of the application is relatively simple, and a special complex process is reduced; the present method is suitable for a large-scale industrial production without special adjustment or control of a morphology; and the product performance is relatively good and thus has certain competitive advantages.

DETAILED DESCRIPTION OF THE INVENTION

Figure 1:
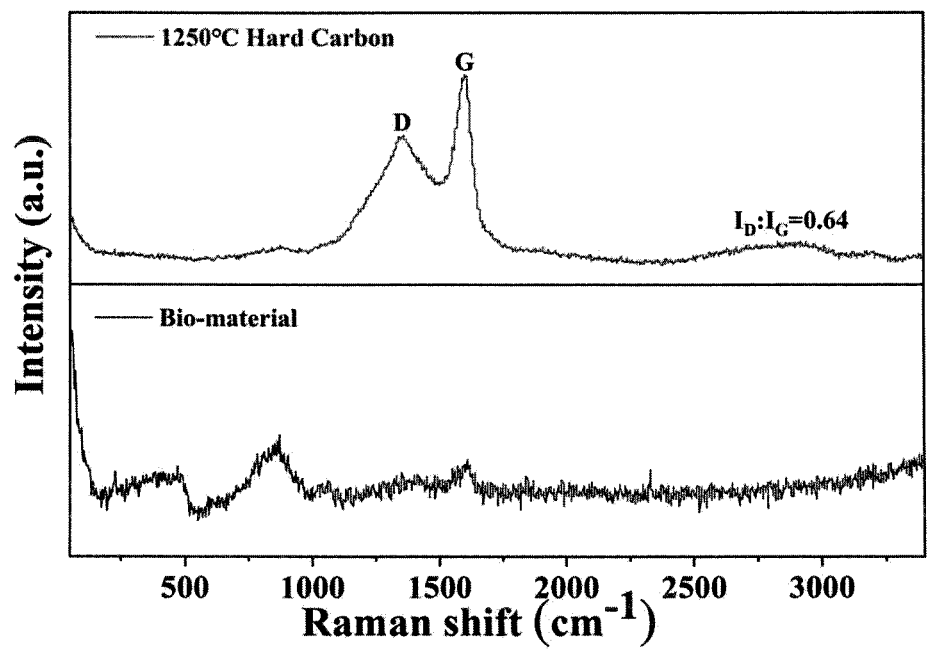
FIG. 1 is a Raman diagram in embodiment 3.

In order to help better understand the technical content of the present application, specific embodiments are provided below to further explain the present application.

The experimental methods used in the embodiments of the present application are conventional methods unless otherwise specified.

The materials, reagents and the like used in the embodiments of the present application are commercially available unless otherwise specified.

Embodiment 1

The method for preparing the hard carbon anode of the lithium/sodium ion battery by biochar, comprising:
- S1, the biochar pretreatment: adding 0.5 M hydrochloric acid to the modified biochar for pickling for 3 hours with a mass-volume ratio of the biochar to the hydrochloric acid being 1:0.077 g/mL, and then rinsing with the deionized water to neutrality, wherein the modified biochar is prepared by impregnating the biochar in a modified liquid which is N-N dimethylformamide and m-aminophenylurea hydrochloride solution in a volume ratio of 1:3, impregnating for 0.2 hours at 20° C., and then drying at 150° C.;
- S2, preparing a precursor material: pouring the rinsed biochar into the stainless steel ball mill jar and adding the absolute ethanol for the wet milling and crushing, wherein a mass-volume ratio of biochar to the absolute ethanol is 0.6:3 g/mL, a revolving speed of the ball mill jar is 200 rpm, and a ball milling time is 3 hours; and
- S3, pyrolysis carbonization: placing the precursor material in the tubular furnace, carbonizing in the argon atmosphere with a carbonization temperature of 1200° C., a carbonization time of 0.5 hours, and an aeration rate of 10 mL/min; performing the heat preservation for 1 hour after the carbonization is finished, wherein a temperature elevation program of the tubular furnace is 30° C. to 1000° C.: a temperature elevation rate is 4° C./min, and 1000 to 1200° C.: the temperature elevation rate is 3° C./min; and cooling to 800° C. at a cooling rate of 3° C./min, and then inletting the argon for the natural cooling to 25° C. to obtain and then inletting the hard carbon anode material.

Embodiment 2

The method for preparing the hard carbon anode of the lithium/sodium ion battery by biochar, comprising:
- S1, the biochar pretreatment: adding 1.5 M hydrochloric acid to the modified biochar for pickling for 12 hours with a mass-volume ratio of the biochar to the hydrochloric acid being 1:0.13 g/mL, and then rinsing with the deionized water to neutrality, wherein the modified biochar is prepared by impregnating the biochar in a modified liquid which is N-N dimethylformamide and m-aminophenylurea hydrochloride solution in a volume ratio of 5:3, impregnating for 2.5 hours at 40° C., and then drying at 200° C.;
- S2, preparing a precursor material: pouring the rinsed biochar into the stainless steel ball mill jar and adding the absolute ethanol for the dry milling and crushing, wherein a mass-volume ratio of biochar to the absolute ethanol is 1.3:5 g/mL, a revolving speed of the ball mill jar is 500 rpm, and a ball milling time is 12 hours; and
- S3, pyrolysis carbonization: placing the precursor material in the tubular furnace, carbonizing in the argon atmosphere with a carbonization temperature of 1300° C., a carbonization time of 3 hours, and an aeration rate of 30 mL/min; performing the heat preservation for 3 hours after the carbonization is finished, wherein a temperature elevation program of the tubular furnace is 30° C. to 1000° C.: a temperature elevation rate is 6° C./min, and 1000 to 1300° C.: the temperature elevation rate is 5° C./min; cooling to 1100° C. at a cooling rate of 5° C./min, and then inletting the argon for the natural cooling to 30° C. to obtain the hard carbon anode material.

Embodiment 3

The method for preparing the hard carbon anode of the lithium/sodium ion battery by biochar, comprising:
- S1, the biochar pretreatment: adding 1 M hydrochloric acid to the modified biochar for pickling for 8 hours with a mass-volume ratio of the biochar to the hydrochloric acid being 1:0.12 g/mL, and then rinsing with the deionized water to neutrality, wherein the modified biochar is prepared by impregnating the biochar in the modified liquid which is N-N dimethylformamide and m-aminophenylurea hydrochloride solution in a volume ratio of 4:3, impregnating for 1.3 hours at 30° C., and then drying at 180° C.;
- S2, preparing the precursor material: pouring the rinsed biochar into the stainless steel ball mill jar and adding the absolute ethanol for the wet milling and crushing, wherein a mass-volume ratio of biochar to the absolute ethanol is 0.9:4 g/mL, a revolving speed of the ball mill jar is 400 rpm, and a ball milling time is 7 hours; and
- S3, the pyrolysis carbonization: placing the precursor material in the tubular furnace, carbonizing in the argon atmosphere with a carbonization temperature of 1250° C., a carbonization time of 2 hours, and an aeration rate of 20 mL/min; performing the heat preservation for 2 hours after the carbonization is finished, wherein a temperature elevation program of the tubular furnace is 30° C. to 1000° C.: a temperature elevation rate is 5° C./min, and 1000 to 1250° C.: the temperature elevation rate is 4° C./min; cooling to 1000° C. at a cooling rate of 4° C./min, and then inletting the argon for the natural cooling to 25 to 30° C. to obtain the hard carbon anode material.

Embodiment 4

This embodiment differs from embodiment 3 in that the biochar is not modified, in particular to the method for preparing the hard carbon anode of the lithium/sodium ion battery by biochar, comprising:
- S1, biochar pretreatment: adding 1 M hydrochloric acid to the biochar for pickling for 8 hours, a mass-volume ratio of the biochar to the hydrochloric acid being 1:0.12 g/mL, and then rinsing with deionized water to neutrality;
- S2, preparing a precursor material: pouring the rinsed biochar into the stainless steel ball mill jar and adding the absolute ethanol for the wet milling and crushing, wherein a mass-volume ratio of the biochar to the absolute ethanol is 0.9:4 g/mL, a revolving speed of the ball mill jar is 400 rpm, and a ball milling time is 7 hours; and S3, the pyrolysis carbonization: placing the precursor material in the tubular furnace, carbonizing in the argon atmosphere with a carbonization temperature of 1250° C., a carbonization time of 2 hours, and an aeration rate of 20 mL/min; performing the heat preservation for 2 hours after the carbonization is finished, wherein a temperature elevation program of the tubular furnace is 30° C. to 1000° C.: a temperature elevation rate is 5° C./min, and 1000 to 1250° C.: the temperature elevation rate is 4° C./min; and cooling to 1000° C. at a cooling rate of 4° C./min, and then inletting the argon for the natural cooling to 25 to 30° C. to obtain the hard carbon anode material.

I. Performance Test (1) The hard carbon anode materials prepared in Embodiments 1-4 were subjected to a performance test by Raman, and then discharged to 5 mV by 1 C=400 mA·g$^{-1}$ at constant current and constant voltage, then charged to 1.5 V at constant current, and cycled for 100 cycles for a constant current performance test, and charged and discharged for 100 cycles, and the test yielded the following electric capacity:

|  | $I_D/I_G$ value | capacitance (mAh · g$^{-1}$) |
| --- | --- | --- |
| Embodiment 1 | 0.69 | 185.6 |
| Embodiment 2 | 0.70 | 180.3 |
| Embodiment 3 | 0.64 | 196.0 |
| Embodiment 4 | 0.72 | 170.4 |

Figure 2:
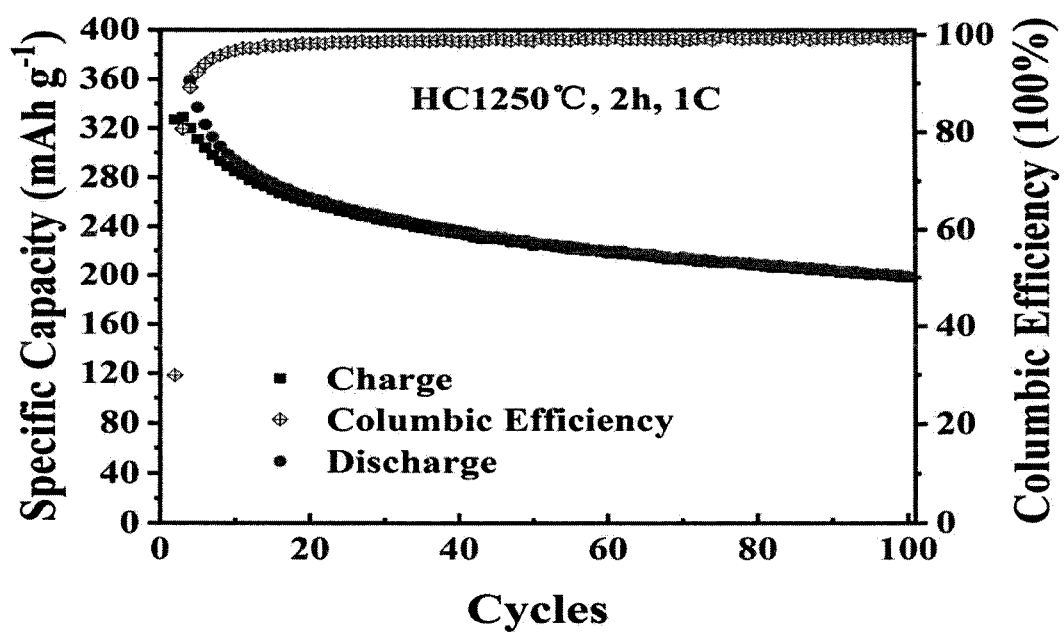
FIG. 2 is a long-cycle charge and discharge capacity in embodiment 3.

According to the above results, the biochar generates the amorphous carbon after carbonization, wherein it can be seen from FIG. 1 that the appearance of two characteristic peaks of carbon material, D peak and G peak of Embodiment 3, indicates that the material is transformed from simple biomass to carbon material, and the $I_D/I_G$ value of Embodiment 3 is 0.64, indicating that the graphitization degree of the generated material is very low, which proves intrinsic amorphous characteristics and amorphous properties of the hard carbon; and as is seen from FIG. 2, the capacitance of 100 cycles is 196.0 mAh·g$^{-1}$, which shows that the performance is stable during the cycle charging and discharging process;

Compared with Embodiment 1 to 2, Embodiment 3 shows that the carbonization temperature and the carbonization time have a greater influence on the biochar, and compared with Embodiment 4, the biochar modified by the present application has an obvious activation effect, a lower graphitization degree and fewer surface defects.

Figure 3:
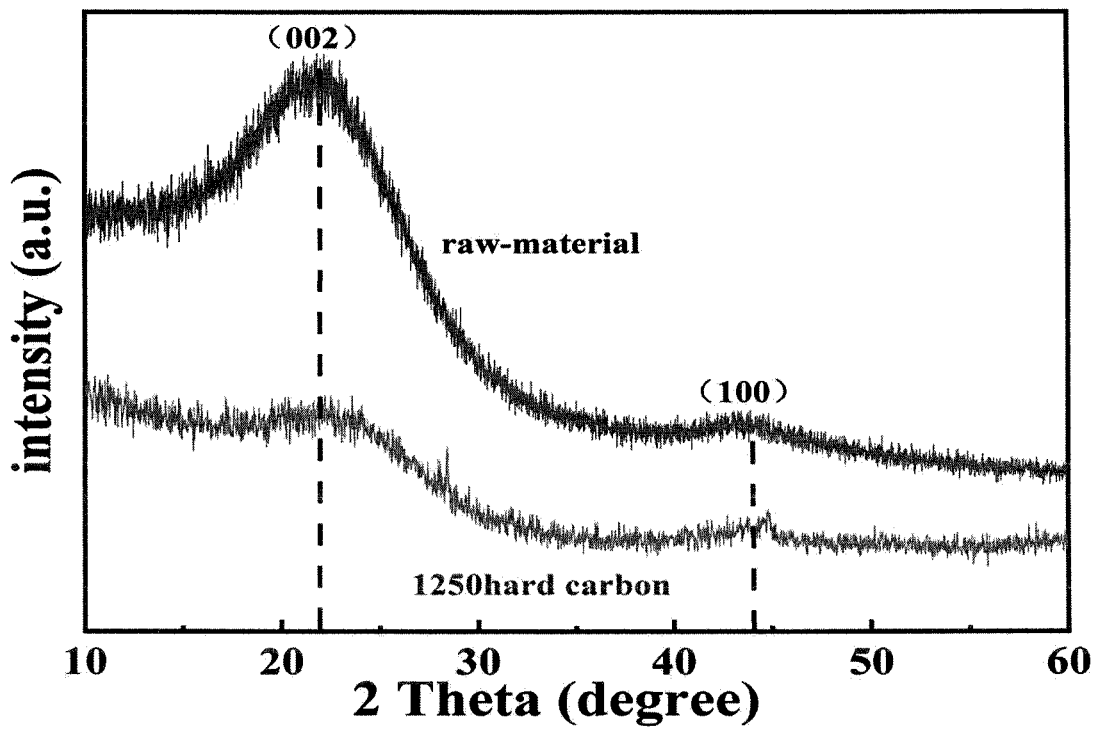
FIG. 3 is an XRD diagram in embodiment 3.

(2) The hard carbon anode material prepared in Embodiment 3 was characterized by XRD, and the type and content of the phase were analyzed from FIG. 3 to produce a pure phase.

Figure 4:
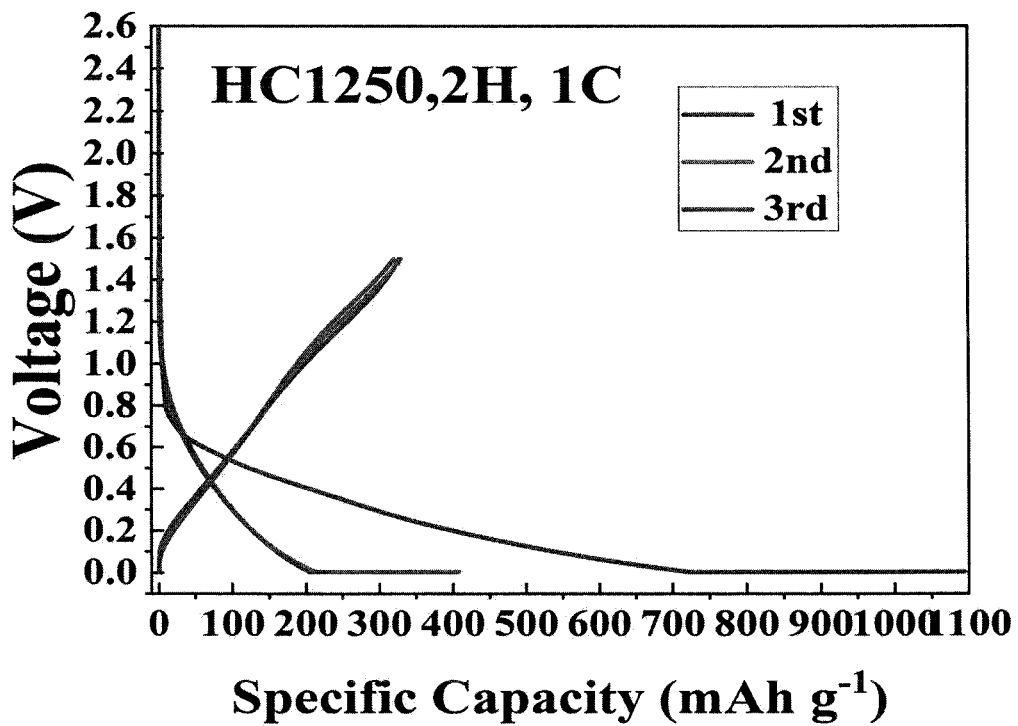
FIG. 4 is a voltage-capacity diagram of first three cycles in embodiment 3.

(3) The hard carbon anode material prepared in Embodiment 3 was tested for voltage-capacity, and it can be seen from FIG. 4 that the curve is relatively smooth, indicating that the anode material is relatively stable.

The foregoing descriptions are only preferred embodiments of the present application, and are not intended to limit the present application; any modification, equivalent replacement, improvement, etc. made within the spirit and principles of the present application shall be included in the scope of protection of the present application.

The invention claimed is:

1. A method for preparing a hard carbon anode of a lithium/sodium ion battery with a biochar, wherein it comprises:
   S1, biochar pretreatment: adding a hydrochloric acid to a modified biochar for a pickling for 3 to 12 hours, and then rinsing with a deionized water to neutrality;
   S2, precursor material preparation: pouring the rinsed biochar into a ball mill jar, adding an absolute ethanol for a milling and crushing, filtering and drying after the ball milling is completed to obtain the precursor material; and
   S3, pyrolysis carbonization: placing the precursor material obtained above in a tubular furnace, carbonizing in an argon atmosphere with a carbonization temperature of 1200 to 1300° C., a carbonization time of 0.5 to 3 hours, and an aeration rate of 10 to 30 mL/min; performing a heat preservation for 1 to 3 hours after the carbonization is finished, cooling to 800 to 1100° C., and then inletting the argon for a natural cooling to 25 to 30° C. to obtain a hard carbon anode material.

2. The method according to of claim 1, wherein the modified biochar is prepared by impregnating the biochar in a modified liquid at 20 to 40° C. for 0.2 to 2.5 hours, and then drying at 150 to 200° C.

3. The method according to claim 2, wherein the modified liquid is N-N dimethylformamide and m-aminophenylurea hydrochloride solution in a volume ratio of 1 to 5:3.

4. The method according to claim 1, wherein a concentration of the hydrochloric acid in S1 is 0.5 to 1.5 M.

5. The method according to claim 1, wherein a mass-volume ratio of the biochar and the hydrochloric acid in Si is 1:0.077 to 0.13 g/mL.

6. The method according to claim 1, wherein a mass-volume ratio of the biochar and the absolute ethanol in S2 is 0.6 to 1.3:3 to 5 g/mL.

7. The method according to claim 1, wherein a revolving speed of the ball mill jar in S2 is 200 to 500 rpm, and a ball milling time is 3 to 12 hours.

8. The method according to claim 1, wherein a temperature elevation program of the tubular furnace in S3 is 30° C. to 1000° C.: a temperature elevation rate is 4 to 6° C./min, and 1000 to 1300° C.: the temperature elevation rate is 3 to 5° C./min.

9. The method according to claim 1, wherein a cooling rate of the tubular furnace in S3 is 3 to 5° C./min.

* * * * *